(12) United States Patent
Ferm et al.

(10) Patent No.: US 7,011,932 B2
(45) Date of Patent: Mar. 14, 2006

(54) POLYMER WAVEGUIDE FABRICATION PROCESS

(75) Inventors: Paul M. Ferm, Morristown, NJ (US); Kevin Battell, Emerson, NJ (US); Karl W. Beeson, Princeton, NJ (US); Macrae Maxfield, Teaneck, NJ (US); Deepti Pant, Framingham, MA (US); Lawrence W. Shacklette, Maplewood, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/846,697

(22) Filed: May 1, 2001

(65) Prior Publication Data

US 2002/0164547 A1 Nov. 7, 2002

(51) Int. Cl.
*G02B 6/10* (2006.01)

(52) U.S. Cl. ...................... 430/321; 385/130
(58) Field of Classification Search ................ 430/321; 385/129, 130, 143, 145
See application file for complete search history.

(56) References Cited

U.S. PATENT DOCUMENTS

| | | | |
|---|---|---|---|
| 4,609,252 A | 9/1986 | Wong et al. | 350/96.12 |
| 5,106,211 A * | 4/1992 | Chiang et al. | 385/132 |
| 5,861,976 A | 1/1999 | Hoekstra | 359/288 |
| 5,903,697 A | 5/1999 | Yamada et al. | 385/129 |
| 6,114,090 A | 9/2000 | Wu et al. | 430/281.1 |
| 6,306,563 B1 * | 10/2001 | Xu et al. | 430/321 |

FOREIGN PATENT DOCUMENTS

JP 1-138509 5/1989

OTHER PUBLICATIONS

"Resists in Microlithography", O'Brien et al., pp. 325 to 376 of Microelectronics Processing: Chemical Engineering Aspects, American Chemical Society, 1989.*

* cited by examiner

Primary Examiner—John A. McPherson

(57) ABSTRACT

The invention relates to a process a process for forming single-mode, organic waveguides employing organic polymeric materials. The process reduces dissolved and gaseous oxygen content to very low quantities, resulting in production of waveguides having superior properties and manufacturability. Also provided is a process for preventing loss of light due to cores having flared ends. A waveguide is produced by sequentially a layer of a liquid, photosensitive buffer and clad composition to a surface of a substrate; deoxygenating under vacuum; overall exposing under an inert gas actinic radiation to partially polymerize the compositions below a full curing. Coating a photosensitive core composition to the clad composition; deoxygenating under vacuum, covering with an inert gas atmosphere; positioning a photomask above, but not in contact with the core layer; imagewise exposing the core through a photomask pattern to actinic radiation to partially polymerize the core composition; developing core; coating a photosensitive overclad composition over the image areas of the core composition; deoxygenating under vacuum; overall exposing the overclad composition, under inert gas to actinic radiation to substantially fully cure the optional buffer composition, the underclad composition, the core composition and the clad composition.

29 Claims, 2 Drawing Sheets

POLYMER WAVEGUIDE FABRICATION PROCESS

BACKGROUND OF THE INVENTION

1. Field of the Invention

The present invention relates to the formation of polymeric optical waveguides, or more particularly to a process for forming single-mode, organic waveguides employing organic polymeric materials. The process reduces dissolved and gaseous oxygen content to very low quantities, resulting in production of waveguides having superior properties and manufacturability.

2. Technical Background

In optical communication systems, messages are transmitted by carrier waves at optical frequencies that are generated by such sources as lasers and light-emitting diodes. There is interest in such optical communication systems because they offer several advantages over conventional communication systems. They have a greatly increased number of channels of communication as well as the ability to transmit messages at much higher speeds than electronic systems using copper wires. This invention is concerned with the formation of light transmissive optical waveguide devices. The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus producing a guiding effect.

It is possible to produce polymeric optical waveguides and other optical interconnect devices which transport optical signals in optical circuitry or optical fiber networks. One method used to form an optical device involves the application of standard photolithographic processes. Photopolymers are of particular interest for optical interconnect applications because they can be patterned by photolithographic techniques which are well known in the art. Lithographic processes are used to define a pattern in a light-sensitive, photopolymer containing layer deposited on a substrate.

Planar polymer waveguides typically comprise layers of low loss optical materials of precise indices of refraction. Both step index and gradient index waveguide structures are known in the art. For planar polymer and glass waveguides, in particular, step index structures are most easily achieved through successive coating of materials with differing indices of refraction. Typically, a waveguide core has a refractive index which is 0.3% to 2% higher than a clad. The magnitude of this refractive index difference ($\Delta n$) is set to optimize the performance of the planar waveguides or to match light modes when the transition is made from the planar device to an optical fiber.

Waveguides can be made using photopolymerizable optical materials which can be coated and cured on a substrate. Typically, the materials include mixtures of monomeric and oligomeric components which are blended to provide the correct index of refraction. Among the many known photopolymers, acrylate materials have been widely used as waveguide materials because of their optical clarity, low birefringence and the ready availability of a wide range of monomers. These photopolymerizable materials, especially acrylate type materials, have properties that make their processing very difficult. In particular, dissolved and gaseous oxygen present within or in the proximity of the photopolymerizable material quenches polymerization and therefore its abundance must be carefully regulated both within and at the immediate surface of the material. The presence of oxygen affects the speed of cure, the degree of cure, the degree of resolution, and the minimum feature size which can be created by a lithographic patterning process. Also, since some of these photopolymerizable materials remain a low viscosity liquid at room temperature, they require handling in a manner which does not disturb the thin film which is to be lithographically imaged. For this reason some conventional means of excluding oxygen, such as the use of a direct-contact UV-transparent cover, cannot be readily employed.

Typical acrylate curing processes are capable of reducing or eliminating the effects of oxygen by either reducing the amount of available oxygen or overcoming its presence through the use of high UV power flux. One typical process is to introduce a solid barrier in contact with the film. This barrier is sufficient to allow a strong UV light source to polymerize the liquid system without residual oxygen hindering the polymerization process. This may be done by pressing a sheet with a low oxygen permeability against a film composition for the purpose of reducing the amount of oxygen in the composition. In another process, a PET film is applied to a liquid monomer film. However, residual oxygen within the photopolymerizable material can surprisingly degrade the fine lithography needed for formation of fine lithographic structures, e.g. single mode waveguides. In addition, the placement of a solid surface upon liquid photopolymerizable material leads to film non-uniformities due to surface tension of the liquid film interacting with the solid substrate below and above. These film non-uniformities degrade the required lithographic structures required, e.g. for single-mode waveguides. Even with a liquid photopolymerizable material with a very high viscosity that prevents flowing and the creation of long range film non-uniformities, the placement of an oxygen barrier substrate against this surface can introduce particulate contamination, can stick to the film and create defects due to adhesion of the barrier plate to the film, and will not conform perfectly to this drier film, thus allowing intrusion of oxygen during the polymerization process.

Another typical process is to reduce the oxygen concentration in the material and its environment to about 2%. This reduction in oxygen concentration is sufficient to allow a strong UV light source to polymerize the liquid system without the remaining oxygen hindering polymerization. However again, residual oxygen within the photopolymerizable material along with oxygen replenishment from residual oxygen left in the purge ambient can markedly degrade the reproducibility of the cure of the material and can surprisingly degrade the fine lithography needed for formation of fine lithographic structures, e.g. single-mode waveguides. Also, different materials will have different sensitivity to residual oxygen and can prevent curing. A less typical process involves application of a non-polymerizing, inert liquid barrier layer. Layers such as water, glycerin, or ethylene glycol, will act as reasonable barrier layers, however, this process has several deficiencies. The layer must be applied without mixing with or dewetting from the lower layer, it must be removed without contaminating the photopolymerizing lower layer, and finally it requires that a photomask used for imagewise exposing the photosensitive composition be further removed from the photopolymerizing layer, thus reducing the lithographic resolution.

SUMMARY OF THE INVENTION

The invention provides a method for producing a polymer waveguide on a substrate. One of the following steps is then conducted:

coating a layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition;

coating a layer of a liquid, photosensitive underclad composition onto the substrate; then deoxygenating the underclad layer under the conditions of vacuum, purging with inert gas, or a combination of vacuum and purging with inert gas; overall exposing the deoxygenated underclad composition to sufficient actinic radiation to only partially polymerize the underclad composition to a level below a substantially full curing of the underclad composition; or coating a layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition; followed by coating a layer of a liquid, photosensitive underclad composition onto the buffer layer; then deoxygenating the underclad layer under the conditions of vacuum, purging with inert gas, or a combination of vacuum and purging with inert gas; overall exposing the deoxygenated underclad composition to sufficient actinic radiation to only partially polymerize the underclad composition to a level below a substantially full curing of the clad composition.

Thereafter one coats a layer of a liquid, photosensitive core composition onto a surface of the buffer layer or the clad layer followed by deoxygenating the core layer under the conditions of vacuum, purging with inert gas, or a combination of vacuum and purging with inert gas and then covering the core layer with an inert gas atmosphere. Then a photomask having a waveguide pattern is positioned at a level above, substantially parallel to, and either in contact with the core layer or not in contact with the core layer, with imagewise exposing the photosensitive core composition through said photomask, to sufficient actinic radiation to only partially polymerize the core composition to a level below a substantially full curing of the core composition but beyond the gel point of the core composition, while maintaining the core coated substrate in an inert gas atmosphere. Then one develops the exposed core composition layer to remove the non-image areas while not removing the image areas. Then one coats a layer of a liquid, photosensitive overclad composition over at least the image areas of the core composition. This is followed by deoxygenating the overclad layer and all underlying layers under conditions of vacuum, purging with inert gas, or a combination of vacuum and purging with inert gas. Then one overall exposes the overclad composition, under an inert gas atmosphere, to sufficient actinic radiation to substantially fully cure, the buffer composition layer if present, the clad composition layer if present, the core composition layer and the overclad composition layer.

The invention also provides a polymeric waveguide which comprises a substrate and a polymeric patterned core on the substrate. Either a polymeric buffer layer, or a polymeric underclad layer, or sequentially both a polymeric buffer layer and a polymeric underclad layer are positioned between the substrate and the polymeric patterned core. The polymeric buffer layer, or the polymeric underclad layer or both the polymeric buffer layer and a polymeric underclad layer have a pattern which are along and symmetrical with the core.

The present invention provides an improved process for forming polymeric waveguides from photopolymerizable materials. Initially, after a rigorous chemical cleaning of a substrate, the substrate may be primed with acrylate functionalized chloro- or alkoxy-type silane compounds. This is followed by an optional application of a tie layer of a highly crosslinkable acrylate monomer mixture followed by deoxygenation under vacuum, under purging with nitrogen gas, or under a combination of vacuum and purging. Deoxygenation is followed by a blanket UV cure of the film to a level below its full cure. The choice of deoxygenation conditions being either vacuum or purge gas or a combination of these two is driven by material and process considerations. In the case where process time for degassing must be kept to a minimum, vacuum degassing is desired. The low ambient pressure acts as a physical force to speed emission of dissolved gases. However, if components in the photopolymerizable material are easily evaporated, then extensive vacuum degassing can cause excessive evaporation and removal of these components, which is typically not desirable. Purging with nitrogen gas would be done in this case. Next follows an application of a layer of buffer material having a refractive index of about 1% to about 3% less than that of the core, also followed by deoxygenation under vacuum, under purging with nitrogen gas, or under a combination of vacuum and purging. Deoxygenation is followed by a blanket UV cure of the film to a level below its full cure. Thereafter, a layer of clad material having a refractive index of about 0.3% to about 1.5% less than that of the core is optionally applied and followed by deoxygenation under vacuum, under purging with nitrogen gas, or under a combination of vacuum and purging. Deoxygenation is again followed by a blanket UV cure of the film to a level below its full cure. Next the layer of core material is applied. After the core material is applied, a photomask is lowered to a predetermined level above the core layer. Usually the mask is 500 or more $\mu$m away during the deoxygenation stage and is typically lowered to from about 0 $\mu$m to about 20 $\mu$m above the core layer, and more usually from about 5 $\mu$m to about 20 $\mu$m above the core layer. After the core layer material and mask are in place, deoxygenation under vacuum, under purging with nitrogen gas, or under a combination of vacuum and purging, is followed by UV cure of the waveguide pattern to a level below the full cure of the waveguide cores. The non-exposed core material may then be developed with a fluorinated solvent, followed by application of an overclad layer of clad material and then by deoxygenation under vacuum, under purging with nitrogen gas, or under a combination of vacuum and purging. Deoxygenation is followed by a blanket UV cure of the film to a fully cured level. Finally, the overall composition may be thermally annealed to fully cure the buffer composition, clad composition and core composition and eliminate any residual volatiles. This process having extensive and controlled deoxygenation via vacuum and purging with nitrogen gas produces intermediate stage layers of photopolymerizable material having very low quantities of dissolved and gaseous oxygen, resulting in production of waveguides having superior properties and manufacturability.

A further extension of this invention comprises an improved process for the use of low viscosity photopolymerizable materials. Materials with viscosities in the range of 50 to 1000 centipoise, are quite fluid. Many of these compounds will dewet from the surface, starting at the edge of the coated layer to form a raised bead of material, known as an edge bead. Since successful lithographic exposure of these layers involves positioning a mask about $5\mu$ to about $20\,\mu$m above the core layer, the edge beads of about this size or larger are very detrimental to the fabrication process. Therefore, this invention also requires controlling the time between coating of the substrate and exposure of the successive layers. Natural edge beads formed during a typical spin coating process will be roughly equal to twice the thickness of the layer at a point far from the edge. These menisci are also found in other coating processes known in the art, such as dip coating, slot coating, roller coating, doctor blading, liquid casting or the like. These edge beads must be removed initially to allow close positioning of the photomask to the liquid layers without contacting and contaminating the photomask. After initial removal of this edge bead, the deoxygenation and exposure must take place within a time prescribed by the exact nature of the materials being used to prevent spontaneous reformation of an edge bead due to the dewetting.

DETAILED DESCRIPTION OF THE INVENTION

Figure 1:
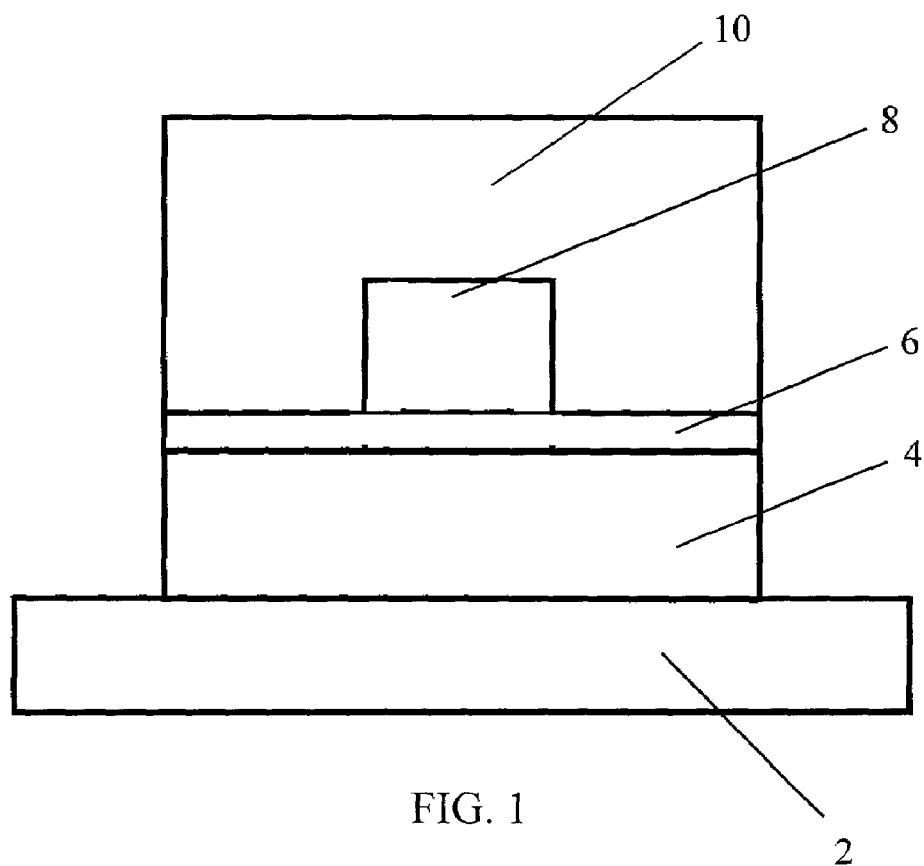
FIG. 1 is a schematic representation of a polymeric waveguide.

The invention provides a process for forming single-mode, polymeric optical waveguides. Referring to FIG. 1, there is shown a schematic representation of a waveguide formed by the process of the invention. The process comprises first coating a layer of a liquid, photosensitive buffer composition 4 onto a surface of a substrate 2. The substrate 2 may be any material on which it is desired to establish a waveguide including semiconductor materials such as silicon, silicon oxide, gallium arsenide, silicon nitride, glass, quartz, plastics, ceramics, crystalline materials and the like. The substrate 2 may or may not contain other devices, for example, topographical features such as grooves or electrical circuits or electro-optic elements such as laser diodes or pin detectors. The substrate 2 is usually cleaned prior to being coated with the buffer layer. More usually the substrate 2 is cleaned and then primed with an acrylate functionalized chloro- or alkoxy-silane compound. After the substrate 2 is cleaned and primed with an acrylate functionalized chloro- or alkoxy-silane compound, the substrate 2 may be coated with a suitable adhesion promoting tie layer. Such a tie layer may comprise a photosensitive, crosslinkable acrylate monomer containing composition. Crosslinkable acrylate monomer mixtures are well known in the art. This crosslinkable acrylate-monomer layer may then be deoxygenated under the conditions of vacuum, purging with inert gas, or a combination of vacuum and purging in a chamber sufficiently to reduce the level of ambient oxygen to about 2% or less, more often to about 0.3% or less, and usually to about 0.1% or less. It is usual that these levels of ambient oxygen content are obtained by deoxygenation of each layer of the waveguide as herein described. Thereafter, the acrylate composition is overall exposed under an inert gas atmosphere to sufficient actinic radiation to cure the acrylate composition to at least a level above its gel point. Alternatively, suitable tie layers may comprise other polymers such as epoxies, or vinylethers, or the like.

Since the substrates 2 of this invention are often absorbing at optical wavelengths of importance to telecommunications, any portion of the propagating light that reaches the substrate is subject to absorption. Absorption of light by the substrate leads to an undesirable polarization-dependent loss of optical power from the propagating signal. The purpose of an intermediate buffer layer 4 is to restrict the penetration of the light into the substrate 2 and to prevent any significant amount of the light from reaching the substrate 2. For a single-mode waveguide, some appreciable fraction of the propagating light penetrates out of the core region 8. The intensity of this light decays exponentially along any direction perpendicular to the core direction. In addition, any active thermo-optic device, which has a heater, deposed on the upper surface of the waveguide produces an index gradient which acts to push a greater fraction of light underneath the core in a direction toward the substrate. Since the substrates of this invention are absorbing at optical wavelengths of importance to this invention are absorbing at optical wavelengths of importance to telecommunications, any portion of the propagating light that reaches the substrate is subject to absorption. Absorption of light by the substrate leads to an undesirable polarization-dependent loss of optical power from the propagating signal. In principal using a thick undercladding layer to isolate the core from the substrate can prevent this undesirable result. Eliminating the problem to the desired degree, however, requires the use of an impracticably thick undercladding. The purpose of the buffer 4 of this invention is to restrict the penetration of the light and to prevent any significant amount of the light from reaching the substrate 2. In order for the buffer 4 to function as desired it is necessary for its index of refraction to be significantly below that of the core 8 and the cladding. We can define a quantity, $\Delta$n, to be the difference in index of refraction between the core and the cladding. For a given core cross-sectional size, this quantity must be below a certain specified limit for the waveguide to be single-mode, and is typically fixed at a point just below this required limit to ensure low loss in bends, good coupling to conventional fibers, and relatively high confinement of the light within the core. The difference between the index of the core 8 and the buffer 4 is desired to be greater than about 1.5 times $\Delta$n, is more desirably greater than about 2 times $\Delta$n, and is most desirably greater than about 3 times $\Delta$n. In order for the buffer to function as desired, it is necessary for its index of refraction to be significantly below that of the core and the cladding layers. The polymeric buffer layer 4 may be applied in a number of different ways known in the art, such as spin coating, dip coating, slot coating, roller coating, doctor blading, liquid casting or the like. The buffer layer 4 may comprise photopolymerizable compounds, such as acrylate compounds. Useful acrylate compounds are described below. The buffer layer may have a thickness of from about 3 microns to about 500 microns, more usually from about 5 microns to about 50 microns. Most desirably the buffer layer has a thickness of from about 7 microns to about 30 microns.

After this buffer layer 4 is coated onto the substrate 2, the coated substrate 2 is then deoxygenated under the conditions of vacuum, purging with inert gas, or a combination of vacuum and purging inside an enclosed chamber. After the buffer composition is deoxygenated, it is overall exposed under an inert gas atmosphere in the purge chamber to sufficient actinic radiation to only partially polymerize the buffer composition to a level below a substantially full curing of the buffer composition. The buffer layer 4 may be exposed to sufficient actinic radiation to polymerize the composition to at least the gel point, but exposed to less actinic radiation than that amount above which additional actinic radiation exposure would cause no effective change in the refractive index of the composition. It is an important feature of this invention that the buffer composition, and subsequently the clad 6 and core 8 compositions are only partially polymerized. This partial polymerization is particularly desirable with waveguides having multiple layers of photopolymers because it leaves chemical end groups of the polymers in each layer available for reaction to subsequent layers, resulting in superior adhesion between the layers. Also, the materials selected to be used for each of the layers of the waveguide are chosen to ensure diffusion of distinct monomers within and between the different layers to create superior, gradient index profiles.

Next, a layer of a liquid, photosensitive clad composition 6 is coated onto a surface of the partially cured buffer composition 4. The clad layer 6 may also be applied via the above mentioned techniques. The clad layer 6 may also comprise photopolymerizable acrylate compounds which are described below. It is desired that the clad layer 6 has a thickness of from about 0 $\mu$m to about 500 $\mu$m. More usually the clad layer 6 has a thickness of from about 1 $\mu$m to about 10 $\mu$m, most desirably from about 1 $\mu$m to about 3 $\mu$m. As a result of the underlying buffer layer 4 being only partially polymerized, unreacted polymer end groups at the interface between the layers are able to react with each other, resulting in superior adhesion between the layers.

After the clad layer 6 is deposited onto the buffer layer, the clad coated substrate is then deoxygenated under the conditions of vacuum, purging with inert gas, or a combination of vacuum and purging inside an enclosed chamber. After the clad composition is deoxygenated, it is overall exposed under an inert gas atmosphere in the purge chamber to sufficient actinic radiation sufficient to only partially polymerize the clad composition to a level below a substantially full curing of the clad composition. The clad layer 6 may be exposed to sufficient actinic radiation to polymerize the compositions to at least the gel point, but exposed to less actinic radiation than that amount above which additional actinic radiation exposure would cause no effective change in the refractive index of the composition.

After the clad layer 6 has been partially cured, a layer of a liquid, photosensitive core composition 8 is coated onto a surface of the clad composition 6. The core layer 8 may also be applied via the above mentioned techniques. As a result of the core being only partially polymerized, unreacted polymer end groups at the interface between the layers are able to react with each other, resulting in superior adhesion between the layers. The core layer 8 may comprise light transmissive photopolymerizable acrylate compounds which are described below. Usually the core layer 8 has a thickness of from about 2 $\mu$m to about 10 $\mu$m. More usually the core layer has a thickness of from about 5.5 $\mu$m to about 8 $\mu$m. The core coated substrate is then deoxygenated under the conditions of vacuum, purging with inert gas, or a combination of vacuum and purging in the chamber. After the core layer 8 has been deoxygenated it is then covered with an inert gas atmosphere inside the purge chamber.

Next, a core pattern is formed in the core layer. This is done by first positioning a photomask having a waveguide pattern at a level above, but not in contact with the core layer 8. The photomask is positioned from about 3 $\mu$m to about 30 $\mu$m, more usually from about 5 $\mu$m to about 20 $\mu$m above the core composition layer 8. The photosensitive core composition is then imagewise exposed through the photomask to sufficient actinic radiation to only partially polymerize the core composition to a level below a substantially full curing of the core composition, while maintaining the core coated substrate in an inert gas atmosphere. Subsequently, the exposed core composition is developed to remove the non-image areas while not removing the image areas, thereby forming a light transmissive, single-mode core 8 on the clad layer 6 and revealing a portion of the clad layer 6. Any conventional development method can be used, for example, flushing with a solvent for the unirradiated composition. Such solvents include polar solvents, such as alcohols and ketones. The useful solvents include acetone, methanol, propanol, tetrahydrofuran, ethyl acetate and fluorinated solvents. Of these, fluorinated solvents are desirable.

The core may have a cross-sectional width about equal to its cross-sectional height and the cross-sectional width and height are each selected from the group consisting of about 2 $\mu$m, about 4 $\mu$m, about 5 $\mu$m, about 6 $\mu$m, about 7 $\mu$m, about 8 $\mu$m, and about 10 $\mu$m. The core layer has a cross-sectional width and height of which each range from about 2 $\mu$m to about 10 $\mu$m, more often the core has a cross-sectional width and height which each range from about 6 $\mu$m to about 8 $\mu$m. It is also desired that the width of the core is no more than about twice the height of the core, and the height is no more than about twice the width. Further, in an embodiment of the invention the core is single mode in each of its width and height. In a single-mode optical waveguide the core has a cross-sectional width and a cross-sectional height, and wherein the core cross-sectional width and cross-sectional height together with the value of An are selected such that the waveguide is single-mode for all optical communication wavelengths greater than about 1300 nm. In order to minimize coupling losses to standard single-mode glass fiber, for example to SMF-28 sold by Corning Incorporated, a core cross-sectional dimension between 6×6 microns and 8×8 microns is desired.

In addition to making planar waveguides using the lithographic method presented, it is also be possible to form the core pattern by reactive ion etching, microreplication, direct laser writing, laser ablation, or by plasma etching.

Figure 2:
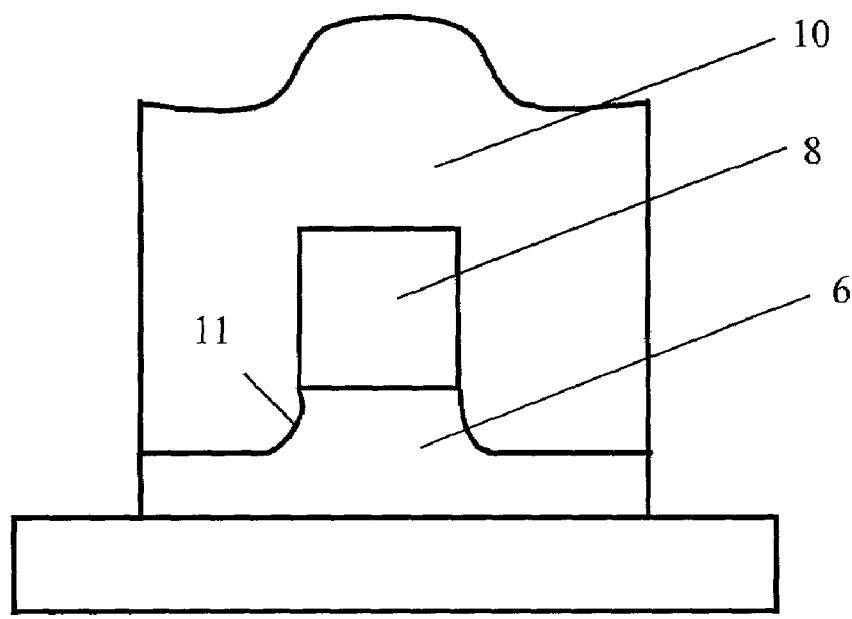
FIG. 2 is a schematic representation of a waveguide having a partially removed clad layer and no buffer layer.
Figure 3:
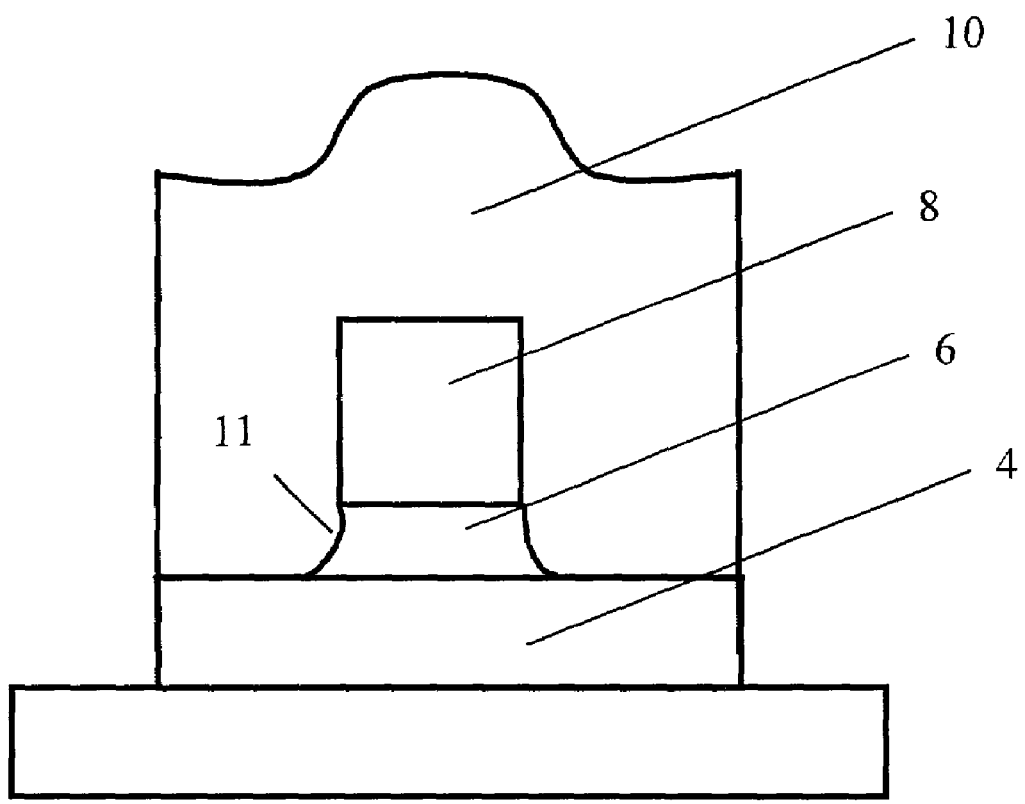
FIG. 3 is a schematic representation of a waveguide having a partially removed clad layer and a buffer layer.

It is not uncommon for etching or development of non-exposed areas of the core layer to form flared ends at the bottom of the core layer. It has been found that cores having these flared ends cause undesirable leakage of light during operation of the waveguide. The present invention provides a solution to this problem wherein the etching or development of the core layer is allowed to partially etch into or partially develop down through a portion of the partially cured clad layer 6 at an area 11 just below the interface of the core layer 8 and clad layer 6. Referring to FIG. 2, there is shown a schematic representation of a waveguide structure having an over etched underclad layer 6 which is symmetrical along the core pattern. As seen in the figure, the underclad layer 6 is not removed all the way through to reveal part of the substrate. Referring to FIG. 3, there is shown a schematic representation of a waveguide structure wherein the underclad layer 6 is removed all the way through, revealing part of an underlying buffer layer 4 which is symmetrical along the core pattern. It is not necessary that the underclad 6 be removed all the way through to the buffer layer, but when it is, it is desired that a buffer layer 4 be present. As seen in these figures, the underclad 6 layer then has flared ends rather than the core. This does not result in substantial leakage of light as compared to a flared core. The buffer layer 4, or underclad layer or both the buffer layer and a underclad layer may have a lower level which is at least about 0.5 μm below the lowest level of the core.

After the core 8 is formed, a layer of a liquid, photosensitive overclad composition 10 is coated over the image areas of the core composition and over the revealed portions of the underclad layer 6. The overclad layer 10 may also be applied via the above mentioned techniques. The overclad layer 10 also may comprise photopolymerizable acrylate compounds which are described below. It is desired that the overclad layer 10 has a thickness measured from the top of the core of from about 3 μm to about 30 μm. More desirably the overclad layer has a thickness of from about 5 μm to about 20 μm, most desirably from about 8 μm to about 15 μm. As a result of the underlying core and underlying underclad layer 6 being only partially polymerized, unreacted polymer end groups at the interface between each of the layers are able to react with each other, resulting in superior adhesion between the layers.

After the overclad layer 10 is deposited onto the core 8, the overclad 10 and all underlying layers are then deoxygenated under the conditions of vacuum, purging with inert gas, or a combination of vacuum and purging inside an enclosed chamber. After the overclad composition and underlying layers are deoxygenated, they are overall exposed under an inert gas atmosphere in the purge chamber to sufficient actinic radiation to substantially fully cure the overclad composition and all underlying layers.

The waveguide layers are formed using photopolymerizable optical materials that include mixtures of monomeric and oligomeric components which are blended to provide a desired index of refraction for each layer. The particular index of refraction for each layer has a significant effect on the performance of the waveguide. In an embodiment of the invention, when selecting the photopolymerizable compounds to be used in each of the core 8, underclad 6 and overclad 10 layers, it is important that the refractive index of the substantially fully cured, polymerized buffer composition is from about 0.75% to about 3% less than the refractive index of the substantially fully cured, polymerized core, and more usually from about 1% to about 3% less than the refractive index of the substantially fully cured, polymerized core; wherein the refractive index of the substantially fully cured, polymerized clad composition is from about 0.3% to about 1.5% less than the refractive index of the substantially fully cured, polymerized core. The refractive index of the clad with respect to that of the core is determined by the dimensions of the cross-section of the core. If a single-mode guide is desired, the index must be below the single-mode cutoff limit for the guide dimensions employed, but is usually close to but not above this limit value.

Usually the refractive index $n_c$ of the core is in the range of from about 1.33 to about 1.7, or more desirably from about 1.4 to about 1.55. Usually the undercladding has a refractive index $n_u$ in the range of from about 1.3 to about 1.65, or more desirably from about 1.35 to about 1.55. Usually the overcladding has a refractive index $n_o$ in the range of from about 1.3 to about 1.65, or more desirably from about 1.35 to about 1.55. It is also important to select compounds that produce a buffer layer 4 having a refractive index $n_b$ less than those of the core material 8 and each of the cladding layers 6 and 10. Usually the buffer 4 has a refractive index in the range of from about 1.3 to about 1.55, or more desirably from about 1.3 to about 1.4. These indices are measured at 1550 nm.

The compositions used to form each of the buffer 4, underclad layer 6, core 8 and overclad 10 comprise a photopolymerizable compound and a photoinitiator. The photopolymerizable compound may be a monomer, oligomer or polymer which is an addition polymerizable, non-gaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. They are selected such that the formed polymerized element has the desired refractive index as described above. The determination of the refractive index for the particularly selected polymerized compositions are easily determinable by those skilled in the art.

Multifunctional acrylate monomers are desired. The generalized structure of the multifunctional acrylates is given below:

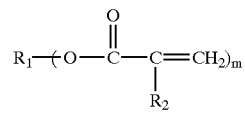

For the core, m may range from 1 to about 6; $R_2$ is H or $CH_3$, and $R_1$ is a linkage of aliphatic, aromatic or aliphatic and aromatic mixed organic molecular segments. $R_1$ may be an alkylene, alkylene oxide, arylene oxide, aliphatic polyether or polyester moiety and $R_2$ is preferably H. To ensure solvent resistance of the film and high contrast photolithography, crosslinked polymers and therefore multifunctional acrylate monomers (m≧2) are desired. It is also desirable to reduce stress induced scattering optical loss of the final waveguiding device by using flexible, low glass transition temperature (Tg) polymers. It is known in the art that glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with 1≦m≦3, usually m=2, and long linkage segments between two ethylenically unsaturated functionalities are desired. For this invention, long linkage segments are those which have an average molecular chain length of at least about 4 carbon atoms or larger and desirably 6 or larger. Suitable flexible linkage structures include alkylenes with chain length larger than about 3 carbon atoms, poly(ethylene oxide), poly(propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize. Suitable substitutes nonexclusively include alkyl, aryl, alkoxy and sulfoxide groups, etc. To ensure high resistance to thermal degradation and discoloration, thermally stable molecular structures of $R_1$ are desired. Such $R_1$ segments should be free of thermally susceptible moieties such as aromatic urethane and amide groups. To ensure low birefringence, $R_1$ linkages with low stress optic coefficient and optical polarizability are desired.

Both low molecular weight monomers as well as higher molecular weight oligomers are typically included in each layer. The core layer 8 typically contains the largest quantity of higher index, low molecular weight materials. In its liquid state this low molecular weight component is allowed to diffuse into the lower clad, before and during exposure of the core 8. The low molecular weight component in the pre-cured core 8 is also allowed to diffuse into the overclad layer 10, before and during the overclad application and cure step.

For the cladding layers 6 and 10, the acrylate is also as described above, however, the average molecular chain length between ethylenically unsaturated functionalities is usually about 6 carbon atoms or longer, more usually 8 or longer and most usually 12 or longer. Suitable flexible linkage structures include alkylenes with chain length larger than 6 carbon atoms, poly(ethylene oxide), poly(propylene oxide) and ethoxylated bisphenol A.

In an embodiment of the invention, materials for each the buffer 4, underclad layer 6, core layer 8 and overcladding layer 10 also include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Suitable multifunctional acrylate oligomers include, but are not limited to acrylated epoxies, acrylated polyurethanes and acrylated polyesters. Suitable photopolymerizable compounds are aryl acrylates. Illustrative of such aryl acrylate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. Suitable aryl acrylate monomers are multifunctional aryl acrylates and desired aryl acrylate monomers are di, tri and tetra acrylates based on the bisphenol-A structure. Aryl acrylate monomers may be alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Polymerizable components may be monomers having the structure (I):

In an embodiment, for the core, n is about 10 or less, usually about 4 or less and desirably about 2 or less. In one embodiment, for the cladding layers, n is about 2 or more, usually about 4 or more and desirably about 10 or more. Also useful are acrylate containing copolymers which are well known in the art. In an embodiment, each cladding layer comprises a polymerizable component which has the ethoxylated bisphenol-A disacrylate structure (I) shown above wherein $1 \leq n \leq 20$, desirably $4 \leq n \leq 15$, and more desirably $8 \leq n \leq 12$.

The most desired polymerizable compositions are multifunctional fluorinated (meth)acrylates, particularly those based on the following structures:

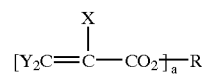

Where Y is H or D; X is H, D, F, Cl, or $CH_3$, and a is an integer from 2 to 4

R =

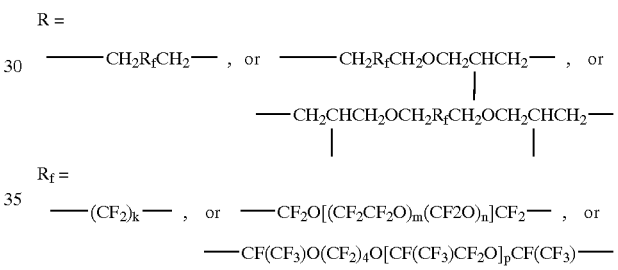

Where k, m, n, and p are integers

These materials have produced waveguides with propagation losses of as little as 0.19 dB/cm at 1550 nanometers. The glass transition temperatures (Tg) of these materials can be easily selected to be below the operating temperature of thermo-optic devices. Low Tg versions of these materials have been shown to have negligible birefringence by grating assisted measurements.

Useful fluorinated (meth)acrylate monomers include compounds comprised of one or more acrylate groups that are attached to partially or fully fluorinated alkyl or alkoxy linkages. For example a tetraacrylate F60TA was made from the polyol, Fluorolink® T, which is commercially available from Ausimont S.p.A. of Milan, Italy, which is shown below:

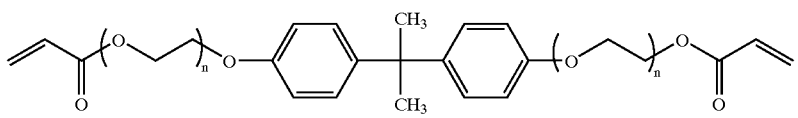

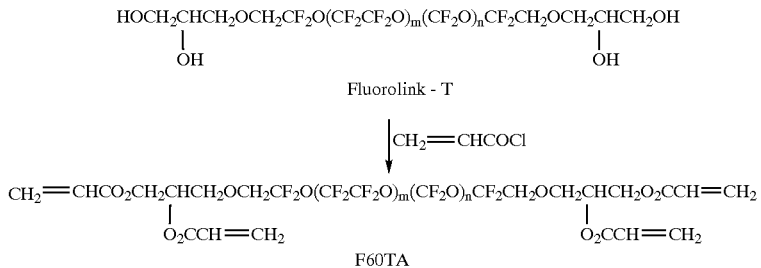

Fluorolink - T $$CH_2\!=\!CHCOCl \downarrow$$

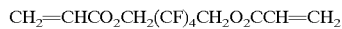

F60TA

Other multifunctional acrylates include C6DIACRY from Akzo Chemicals B.V. of Amersfoort Netherlands:

$CH_2\!=\!CHCO_2CH_2(CF)_4CH_2O_2CCH\!=\!CH_2$

L-12043 from the 3M Company of Saint Paul, Minn.:

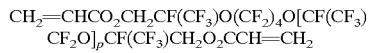

L-9367 from the 3M Company:

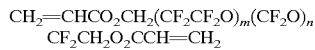

Although each of the buffer 4, underclad 6, overclad 10 and core 8 may be comprised of structurally similar compositions, in order for each of the buffer, clad and overcladding to have a refractive index which is lower than the refractive index of the core, they must have different chemical compositions for any individual application. For example, the buffer layer 4 composition may have a similar Tg property as each of the cladding layers, but need not be the identical composition. The photopolymerizable materials and processing conditions may be selected such that the Tg of the polymerized buffer ranges from about 60° C. or less, usually about 40° C. or less and desirably about 25° C. or less.

It is a feature of the present invention that the photopolymerizable compounds to be used in the waveguide core produce a core which after polymerization has a glass transition temperature of about 80° C. or less and desirably about 50° C. or less. It is a feature of the present invention that the photopolymerizable compounds to be used in the waveguide cladding layers produce cladding layers which after polymerization have a glass transition temperature of about 60° C. or less, usually about 40° C. or less and more desirably about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each overall photopolymerizable composition in an amount sufficient to photopolymerize upon exposure to sufficient actinic radiation. The amount of the photopolymerizable compound in the composition may vary widely and amounts normally used in photopolymerizable compositions for use in the preparation of photopolymers for use as the light transmissive element of light transmissive devices may be used. The amount of photopolymerizable compound is generally used in an amount of from about 35 to about 99.9% by weight of the composition. In an embodiment, the photopolymerizable compound is present in the overall composition in an amount of from about 80% to about 99.5% by weight, desirably from about 95 to about 99.5% based on the weight of the overall composition.

Each light-sensitive composition further comprises at least one free radical generating photoinitiator which photolytically generates free radicals. Usually the photoinitiator is a free radical generating addition polymerization initiator activated by actinic light and is thermally inactive near room temperature (e.g. from about 20° C. to about 80° C.) Any photoinitiator which is known to photopolymerize acrylates can be used. Useful photoinitiators nonexclusively include quinoxaline compounds; the vicinal polyketaldonyl compounds; the alpha-carbonyls; the acyloin ethers; the triarylimidazolyl dimers; the alpha-hydrocarbon substituted aromatic acyloins; polynuclear quinones; and s-triazines.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Photoinitiators are 1-hydroxycyclohexylphenyl ketone (Irgacure® 184), benzoin, benzoin ethyl ether, benzoin isopropyl ether, benzophenone, benzodimethyl ketal (Irgacure® 651), 2,2-diethyloxyacetophenone, 2-hydroxy-2-methyl-1-phenylpropan-1-one (Darocurt® 1173) available from E. Merck of Darmstadt, Germany, 1-[4-(2-hydroxyethoxy)phenyl]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)phenyl]phenylmethanone (Quantacure® BMS) from Great Lake Fine Chemicals Limited Of London, England, and di-campherquinone. The most useful photoinitiators are those which tend not to yellow upon irradiation. Such photoinitiators include benzodimethyl ketal (Irgacure® 651), 2-hydroxy-2-methyl-1-phenylpropan-1-one (Darocur® 1173), 1-hydroxy-cyclohexyl-phenyl ketone (Irgacure® 184), and 1-[4-(2-hydroxyethoxy)phenyl]-2-hydroxy-2-methyl-propan-1-one (Darocur® 2959). Fluorolink®-T and C6DIACRYL are sufficiently miscible that conventional photoinitiators can be used for UV curing. For the more highly fluorinated multifunctional acrylates, such as materials L-12043 and L-9367 from the 3M Company, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and desirably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, glass spheres and the like, dyes, free radical scavengers, contrast enhancers, nitrones and UV absorbers. Antioxidants include such compounds as phenols and particularly hindered phenols including Irganox® 1010 from Ciba-Geigy Corporation of Tarrytown N.Y.; sulfides; organoboron compounds; organophosphorous compounds; N,N'-hexamethylenebis(3,5-di-tert-butyl-4-hydroxyhydrocinnamamide) available from Ciba-Geigy under the tradename Irganox® 1098. Photostabilizers and more particularly hindered amine light stabilizers include but are not limited to poly[(6-morpholino-s-triazine-2,4-diyl) [(2,2,6,6,-tetramethyl-4-piperidyl)imino]-hexamethylene [(2,2,6,6,-tetramethyl-4-piperidyl)imino)] available from Cytec Industries of Wilmington, Del. under the tradename Cyasorb® UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and desirably from about 0.1% to about 1%. Usually all components of the overall composition are in admixture with one another, and desirably in a substantially uniform admixture.

In an embodiment of the invention, the inert gas comprises a gas selected from the group consisting of noble gases, and nitrogen. Of these, nitrogen is the most useful gas. The photopolymer of the invention is conventionally polymerized by exposing the polymerizable composition to actinic radiation of a required wavelength and intensity for a required duration. As used herein "actinic radiation" is defined as light in the visible, ultraviolet or infrared regions of the spectrum, as well as electron beam, ion or neutron beam or X-ray radiation. It is most usual that the actinic radiation used to cure each layer comprises ultraviolet radiation.

Actinic radiation may be in the form of incoherent light or coherent light, for example, light from a laser or a mercury-xenon lamp. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may vary widely, and any conventional wavelengths and sources can be used. It is desirable that the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is desirable. Alternatively, the processing can utilize a multiphoton process initiated by a high intensity source of actinic radiation such as a laser. It is also possible to cure the above fluorinated monomers without photoinitiators through the use of electron beam curing. Electron beam or ion beam excitation may be utilized. Exposure time normally varies from a few seconds to about 1 minute. Temperatures usually range from about 10° C. to about 60° C., however, room temperature is more convenient. Additionally, these materials could be cured thermally through the use of peroxides or other thermal initiators.

Control of the spatial profile of the actinic radiation, that is, where it falls on the layer of photopolymerizable material may be achieved by conventional methods. For example, in a method of the invention a photomask bearing the desired core pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the core pattern onto the film. As used herein, the photomask is positioned in proximity above the core composition layer. Proximity printing of liquid photoresists is used to both control the precise level of pre-cure of each individual state and also to achieve maximum coating uniformity. Any contact with the liquid film and photomask disturbs the film which is exceptionally uniform as provided by the spin coating process. The proximity printing process used herein is carried out in a vacuum and nitrogen purge chamber that surrounds the substrate and the mask. The vacuum or nitrogen purge can be applied to the liquid thin film in any desired combination to fully deoxygenate the film without disturbing the thickness uniformity or other characteristics. Within this deoxygenated environment, a photomask can then be brought near the film, but not touching the film, to allow ultraviolet light exposure of the desired patterns. Superior waveguide uniformity and sidewall smoothness is ensured by the lack of mask contact.

Substantial deoxygenation of acrylate films prior to exposure increases the sensitivity and contrast of the lithography process to provide well-defined polymer structures. High volume manufacturability is also allowed by this process since multiple exposures can be made without the need for mask cleaning. Measurements of actual oxygen level in a liquid, thin film are difficult to carry out. Measurements of the oxygen level in the ambient air environment have been carried out with oxygen probes. In ambient air, the natural concentration of oxygen is 20%. For photopolymerization, the oxygen content may be below 2%, more desirably oxygen level is below 0.5%, and best is below 0.1%. The pattern of the UV exposure in the proximity printing process, the UV cure dose, and the oxygen level are all adjusted to create a gradient cure across the width of the waveguide core. After further diffusion of monomers in the development and overclad steps, this gradient cure profile is ultimately transferred into a gradient index profile for optimum waveguide performance. As a general rule waveguides having a certain degree of index of refraction gradient at their interfaces exhibit a lower degree of light loss through scattering than do waveguides which have a sharp step-index structure.

Another conventional method of spatial control is to use a source of actinic radiation which comprises a directed or focused beam such as a laser or electron beam. Such a beam intersects only a small area of the photo-polymerizable material film surface. The pattern of the desired core 8 is achieved by moving this small intersection point around on the film surface either by scanning the beam in space or by moving the substrate so that the intersection point is changed relative to a stationary beam. These types of exposure using a beam source are known in the art as direct-write methods.

As used herein "partially polymerized" means that some acrylate groups are present after polymerization, i.e., not all acrylates are converted to saturated hydrocarbons. This means that more than 0% of the number of acrylate groups, usually more than about 10%, and desirably more than about 25% of the acrylate groups remain unreacted. The upper limit on the number of unreacted groups depends on the gel point of the monomer(s), which in turn depends on the functionality (the number of acrylate groups per monomer). If the functionality equals an integer, f, then the usual upper limit for unreacted groups is sufficient to cause gelation and is approximately given by the relation $(1-1/f)*100\%$. As an illustration, the number of remaining unreacted groups for a tetra-acrylate monomer be less than 75%, and that the number of remaining unreacted groups for a diacrylate monomer be less than 50%. Partial polymerization of the layers prior to application of the next successive layer allows the layers to intermingle at their interfaces. This intermingling improves adhesion of the layers, and can in some cases be used to control the gradation of index of refraction at the interface.

After each layer has been applied and optionally patterned or impressed with a surface or volume diffraction grating or the like, any remaining unpolymerized acrylates are subjected to a hard curing by a blanket or overall exposure to actinic radiation such that they are substantially fully polymerized. The cure dose (total radiant energy per unit square of surface) for the final cure step is typically from about 10 to about 500 times the dose employed to partially cure each layer during the preceding fabrication steps. Usually the final cure dose is about 100 times this intermediate dose. In this manner, the layers intermix at their interfaces during the early fabrication steps and can be mixed in any desired proportions to fine tune the refractive indices of the layers and the overall device and insure good adhesion between the layers by covalent bonding. Ultimately the desired structure is locked in with the final curing step, so that no further evolution of the structure may take place. In order to make planar polymeric optical waveguides, it is necessary to finely control the refractive index of various core and cladding layers. This can be achieved by tailoring the structure of the monomer used in a particular coating layer to achieve the desired refractive index. In practice, it is easier to blend several miscible monomers of different refractive indexes together to get the desired refractive index needed. When strongly reflecting gratings are required, it is also convenient to employ more than one monomer in the core and optionally in the cladding.

This process additionally allows for sufficient edge bead removal to be carried out on the edge of the substrate after application of each of the layers, such that no contact of any mechanical spacers with the liquid photosensitive compositions occurs. This prevents contamination of any spacers and the photomask.

Flexibility of the materials allows for fabrication of devices with the desired mechanical robustness. Cracking is also avoided even when the device is exposed to very high or very low temperatures. Good adhesion of the materials permits fabrication of robust devices on a variety of substrates without delamination even in some harsh environments such as high temperature and high humidity. Compatibility of device fabrication techniques with semiconductor industry allows for development of hybrid optoelectronic circuitry.

Waveguides of the present invention may have any of a number of convenient cross-sectional shapes, such as circular, polygonal, square, rectangular, trapezoidal, and rounded such as following a parabolic or Gaussian curve on the top and sides and flat at the bottom where they contact the substrate or buffer.

The following non-limiting example serves to illustrate the invention.

EXAMPLE 1

The process described herein was applied to the production of an array of planar polymer waveguides on a silicon wafer. This process was demonstrated to have advantages in ease of use and ease of scalability. Additionally, the process produced fabricated waveguides with high uniformity of such physical features as layer thickness and waveguide geometry, and with very low optical insertion loss at important telecommunication waveguides of roughly 1.3 µm and 1.55 µm.

A 100-mm diameter 4" silicon wafer with a 500 nm thick oxide layer was obtained in a clean state from the wafer manufacturer. The silicon substrate was treated by soaking in 4 M NaOH solution for 1 hour, followed by rinsing under flowing de-ionized water for 15 minutes. The NaOH treatment is meant to ensure complete functionalization of the silicon oxide surface with OH groups. The silicon wafer was dried by blowing off excess water and baking on a 120° C. hot plate for 10 minutes. Neat (3-acryloxypropyl)trichlorosilane was soaked onto a swab and then coated entirely over onto the surface of the wafer. Immediately after swabbing, a cleanroom cloth soaked with ethanol was gently rubbed over the surface to remove any large particles resulting from the fast hydrolysis reaction of the trichlorosilane material. The wafer was then flooded with ethanol and spun at 1000 rpm for 30 seconds. After inspection to ensure that no large particles remained, the wafer was annealed at 120° C. for 3 minutes to assure complete cure of the acryloxy propyl trichlorosilane and to remove any residual ethanol. Three different photopolymerizable material compositions were mixed in advance, filtered, and allowed to settle overnight to allow bubbles from filtration to dissipate. The mixtures consisted of various monomer formulations to produce system components consisting of matched core and cladding with refractive indices of 1.336 and 1.329, respectively, and a buffer mixture with a refractive index of 1.313. All mixtures were pre-filtered to eliminate particles above 0.1 micron. The materials chosen were 100% solids and had viscosities of 100 to 500 cp which allowed them to be spin coated, neat, onto silicon wafers.

The wafer was then centered on the chuck of a spin coating apparatus. A volume of 0.7 ml of a buffer material was dispensed on the wafer. The puddle of monomer was spread at low rotational speed, 300 rpm, and then accelerated to 1300 rpm for 18 seconds to create a wet film that was measured to be 10 $\mu$m thick. At the end of the spin cycle, an edge bead removal cycle was carried out. Here, acetone was dispensed through a capillary tube above the edge of the spinning wafer so as to dispense onto the outer 1 cm of the wafer. The material in this region was thus removed. Finally, a back-side rinse step with acetone was carried out to clean any residual material from the backside of the wafer. The thickness was verified using non-contact, interferometric thin film measurements. The wafer was then transferred to a vacuum-purge chamber. A leak-free chamber with an internal volume of 3 liters was used. The chamber was constructed of aluminum walls, viton o-rings, and quartz window and allowed for both evacuation of air and nitrogen purging. Clamps on the box lid and a check valve were used to ensure that a positive pressure of nitrogen could be established during purging. This also ensured that no air could leak in during the purge cycle. Likewise, air could easily be eliminated in the vacuum cycle by ensuring that the chamber was leak free. Typically, the chamber could be evacuated to 0.2 Torr or less with a standard rotary vein mechanical pump. For process consistency, a standard purge cycle was established. Vacuum was applied for 30 seconds until a level of 5 Torr was reached. This was followed by 1.5 minutes of nitrogen purging at 10 l/min. The sample was then illuminated under a collimated UV light source. Additionally, for blanket exposure steps, a 5 degree diffuser plate was used to prevent the imaging of spurious optical reflections from the UV light source and also to prevent self-focusing of the collimated radiation within the photopolymerizable material. A dose of 317 mJ/cm$^2$ was applied to the buffer. The buffer thickness was confirmed at 10 $\mu$m. Next, an underclad layer was applied. This layer was applied in a manner similar to that described for the buffer layer above, with a higher rotational speed being chosen for the spin step so as to provide the required thinner film thickness. This underclad layer was measured at around 2 $\mu$m thick when wet. The sample was again placed in the vacuum-purge chamber. Vacuum was applied for 30 seconds until a level of 5 Torr was reached. This was followed by 1.5 minutes of nitrogen purging at 10 l/min. Using the 5 degree diffuser, a dose of 28 mJ/cm$^2$ for was applied to the underclad. The sample was again returned to the spin coater, and a 6 $\mu$m thick layer of core material was applied via the method described above. After coating and edge-bead removal, the wafer was placed on a wafer-photomask aligning jig. The jig contained an integrated wafer vacuum chuck. The vacuum chuck was designed to hold the wafer flat and in a specific orientation with respect to the wafer flat. Wires were then placed on the wafer to act as a spacer. With a total film thickness, including buffer, clad, and core, of 18 $\mu$m, the wire was placed on the silicon wafer in the area of the edge bead removal. Thus a 25-$\mu$m wire provided a proximity spacing of approximately 7 $\mu$m . Or alternatively, a 35-$\mu$m wire provided a proximity spacing of 17 $\mu$m. A wedge-shaped spacer, ½" high, was then place next to the wafer. A 6"×6" photomask was then placed, with the high resolution chrome image face down above the wafer and its alignment was ensured by the wafer-photomask alignment jig. One edge of the mask was held up by the wedge shaped spacer. The mask was held away from the wafer to minimize the potential that contact of the photopolymerizable material to the mask could occur during the purge cycle. The core layer was purged with more mild vacuum and purge cycles. Vacuum was applied for 1 sec at a time, reducing the vacuum to 300 Torr. The chamber was then purged back to atmospheric pressure with nitrogen. This vacuum-purge cycle was repeated 6 times, once every 20 seconds, until 100 seconds had elapsed. Finally, nitrogen purge was continued for an additional 320 seconds. The more gentle vacuum cycle prevents evaporating monomers from contaminating the photomask. After the purging was complete, the mask was lowered by moving the wedge using a vacuum-sealed linear motion feed through. The mask thus rested on the wire spacers and did not contact the wafer nor the wet photopolymerizable material layers directly. Using a collimated UV light source, a dose of 17 mJ/cm$^2$ was applied. The wafer was then moved back to the spin coater, where an appropriate solvent was used to spin-develop regions of the wet core layer which had not been exposed. A fluorinated solvent, Galden® HT-110 sold by Ausimont, was used for this purpose. After development, the core ribs were analyzed using a microscope and height profiling instrument. For a rib with nominal dimensions of 6×6 $\mu$m, the height and width were both held within a maximum deviation of 0.2 $\mu$m across the wafer. Since the mask did not contact the liquid core material, the thickness uniformity of the core was excellent. Since the wafer chuck and mask were both very flat and free of bow or warp, the width uniformity attained through the proximity exposure process was also excellent. Next, overclad material was spun on using the techniques described above. In this case, edge bead removal was optional. Since the resist did not dry during spinning, the overclad material flowed over the core ribs and planarized the surface above the core ribs quite well. The residual bump of the core rib under the overclad was about 0.5-$\mu$m tall. The sample was again placed in the vacuum-purge chamber. Vacuum was applied for 30 seconds until a level of 5 Torr was reached. This step was followed by 1.5 minutes of nitrogen purging at 10 l/min. Using the 5 degree diffuser, a dose of 4400 mJ/cm$^2$ for was applied to the overclad and the underlying material layers. The sample was then placed in a 100-° C. oven for three hours to drive out volatile components.

The sample was then measured using standard optical fiber measuring equipment. The sample was first sectioned to prepare an optical end face. Single-mode fiber tips were then brought up to and aligned to the planar waveguide structures created with the above process. The sample was measured by the cleave back technique to have optical coupling loss of 0.3 dB total for both end faces. The propagation loss was determined to be 0.22 dB/cm. The sample exhibited very low polarization dependent loss of <0.05 dB. This polymer planar waveguide was unique for two reasons. First, the coupling loss was low, indicating a good optical mode match between the square cross-section nominally step-index planar waveguide and the round Corning SMF-28 fiber. Second, the propagation loss of 0.22 dB/cm, while higher than that of silica glass materials, is very close to the theoretical absorption losses of the polymer materials themselves. The combination of low propagation loss, low polarization dependent loss and low coupling loss is due to the combination of good materials properties with the superior waveguide fabrication processes disclosed herein.

While the present invention has been particularly shown and described with reference to certain embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method for producing a polymer waveguide on a substrate, the method comprising the steps of:
    a) providing a substrate and then
    b) conducting (i) or (ii) or (iii):
        (i) coating a 5 to 50 micrometer thick layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition;
        (ii) coating a layer of a liquid, photosensitive underclad composition onto the substrate; then deoxygenating the underclad layer under the conditions of vacuum, purging with inert gas, or a combination of vacuum and purging with inert gas; overall exposing the deoxygenated underclad composition to sufficient actinic radiation to only partially polymerize the underclad composition to a level below a substantially full curing of the underclad composition;
        (iii) coating a layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition; followed by coating a layer of a liquid, photosensitive underclad composition onto the buffer layer; then deoxygenating the underclad layer under the conditions of vacuum, purging with inert gas, or a combination of vacuum and purging with inert gas; overall exposing the deoxygenated underclad composition to sufficient actinic radiation to only partially polymerize the underclad composition to a level below a substantially full curing of the clad composition; and
    c) coating a layer of a liquid, photosensitive core composition onto a surface of the buffer layer or the clad layer; then, with a photomask having a waveguide pattern disposed at least 500 micrometers above said core layer, deoxygenating the core layer under the conditions of vacuum, purging with inert gas, or a combination of vacuum and purging with inert gas and then covering the core layer with an inert gas atmosphere;
    d) lowering said photomask to a position substantially parallel to, and 5 to 20 micrometers above said core layer; and then imagewise exposing the photosensitive core composition through said photomask, to sufficient actinic radiation to only partially polymerize the core composition to a level below a substantially full curing of the core composition but beyond the gel point of the core composition, while maintaining the core coated substrate in an inert gas atmosphere;
    e) developing the exposed core composition layer to remove the non-image areas while not removing the image areas;
    f) coating a layer of a liquid, photosensitive overclad composition over at least the image areas of the core composition; then deoxygenating the overclad layer and all underlying layers under conditions of vacuum, purging with inert gas, or a combination of vacuum and purging with inert gas; overall exposing the overclad composition, under an inert gas atmosphere, to sufficient actinic radiation to substantially fully cure, the buffer composition layer if present, the clad composition layer if present, the core composition layer and the overclad composition layer;

and wherein the refractive index of the substantially fully cured, polymerized buffer composition is from about 0.75% to about 3% less than the refractive index of the substantially fully cured, polymerized core; and wherein the refractive index of the substantially fully cured, polymerized underclad composition is from about 0.3% to about 1.5% less than the refractive index of the substantially fully cured, polymerized core.

2. The method of claim 1 where step (i) is conducted.

3. The method of claim 1 where step (ii) is conducted.

4. The method of claim 1 where step (iii) is conducted.

5. The method of claim 1 wherein step (i) further comprises removing an edge portion of the buffer layer prior to actinic radiation exposure of the buffer layer; step (ii) further comprises removing an edge portion of the underclad layer prior to actinic radiation exposure of the clad layer; and step (iii) further comprises removing an edge portion of the buffer layer prior to actinic radiation exposure of the buffer layer and removing an edge portion of the underclad layer prior to actinic radiation exposure of the underclad layer.

6. The method of claim 1 wherein step (c) further comprises removing an edge portion of the core layer prior to step (d).

7. The method of claim 1 further comprising applying an adhesion promoting tie composition layer onto the surface of the substrate prior to step (b).

8. The method of claim 1 further comprising applying a photosensitive adhesion promoting tie composition layer onto the surface of the substrate prior to step (b).

9. The method of claim 1 further comprising applying an adhesion promoting tie composition layer onto the surface of the substrate; removing an edge portion of the tie composition layer, and partially curing the remaining portion of the tie layer prior to step (b).

10. The method of claim 1 further comprising applying a photopolymerizable adhesion promoting tie composition layer onto a surface of the substrate; removing an edge portion of the tie composition layer, and partially curing the remaining portion of the tie layer by exposure to sufficient actinic radiation to only partially polymerize the tie composition to a level below a substantially full curing of the tie composition but beyond the gel point of the tie composition, prior to step (b).

11. The method of claim 1 further comprising the subsequent step of thermally annealing the coated substrate.

12. The method of claim 1 wherein the inert gas comprises nitrogen.

13. The method of claim 1 wherein the actinic radiation comprises ultraviolet radiation.

14. The method of claim 1 wherein development step is conducted with a fluorinated solvent.

15. The method of claim 1 wherein a surface of the substrate has been subjected to a preliminary cleaning step.

16. The method of claim 1 wherein a surface of the substrate has been subjected to a preliminary cleaning step and then primed with an acrylate functionalized chloro- or alkoxy-silane compound.

17. The method of claim 1 wherein the deoxygenating is conducted 2% or less.

18. The method of claim 1 wherein the deoxygenating is conducted such that the level of ambient oxygen is about 0.1% or less.

19. The method of claim 1 wherein the step of exposing the buffer composition and the underclad composition to actinic radiation is conducted such that the buffer composition and the underclad composition are exposed to sufficient actinic radiation to polymerize the compositions to at least the gel point, but exposed to less actinic radiation than that amount above which additional actinic radiation exposure would cause no effective change in the refractive index of the composition.

20. The method of claim 1 wherein the buffer composition comprises one or more fluorinated (meth)acrylate monomers having a functionality of equal to or greater than 2, wherein the refractive index of the substantially fully cured, polymerized buffer composition is from about 0.75% to about 3% less than the refractive index of the substantially fully cured, polymerized core.

21. The method of claim 1 wherein the underclad composition comprises one or more fluorinated (meth)acrylate monomers having a functionality of equal to or greater than 2, wherein the refractive index of the substantially fully cured, polymerized underclad composition is from about 0.3% to about 1.5% less than the refractive index of the substantially fully cured, polymerized core.

22. The method of claim 1 wherein the core composition comprises one or more fluorinated (meth)acrylate monomers having a functionality of equal to or greater than 2.

23. The method of claim 1 wherein the overclad composition comprises one or more fluorinated (meth)acrylate monomers having a functionality of equal to or greater than 2, wherein the refractive index of the substantially fully cured, polymerized underclad composition is from about 0.3% to about 1.5% less than the refractive index of the substantially fully cured, polymerized core.

24. The method of claim 1 further comprising the step of removing at least a portion of the underclad layer or buffer layer from the area adjacent to, along and symmetrical with the core, prior to the step of coating the layer of a liquid, photosensitive overclad composition over at least the image areas of the core composition.

25. A polymeric waveguide formed by the process of claim 1 wherein the polymeric buffer layer, or polymeric underclad layer or both the polymeric buffer layer and a polymeric underclad layer have a pattern which are along and symmetrical with the core.

26. The polymeric waveguide of claim 25 wherein the polymeric buffer layer, or polymeric underclad layer or both the polymeric buffer layer and a polymeric underclad layer have a lower level which is at least about 0.5 µm below the lowest level of the core.

27. The process of claim 1 wherein said partial polymerization steps are conducted such that at least 10% of each of said photosensititve compositions remains unreacted following exposure to actinic radiation.

28. The process of claim 1 wherein said partial polymerization steps are conducted such that at least 25% of each of said photosensititve compositions remains unreacted following exposure to actinic radiation.

29. A method for producing a polymer waveguide on a substrate, the method comprising the steps of:
a) providing a substrate and then
b) conducting (i) or (ii):
   (i) coating a layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition;
   (ii) coating a layer of a liquid, photosensitive buffer composition onto the substrate; then deoxygenating the buffer layer under the conditions of vacuum, purging with inert gas, or a combination of vacuum and purging with inert gas; overall exposing the deoxygenated buffer composition to sufficient actinic radiation to only partially polymerize the buffer composition to a level below a substantially full curing of the buffer composition; followed by coating a layer of a liquid, photosensitive underclad composition onto the buffer layer; then deoxygenating the underclad layer under the conditions of vacuum, purging with inert gas, or a combination of vacuum and purging with inert gas; overall exposing the deoxygenated underclad composition to sufficient actinic radiation to only partially polymerize the underclad composition to a level below a substantially full curing of the clad composition; and
c) coating a layer of a liquid, photosensitive core composition onto a surface of the buffer layer or the clad layer; then, with a photomask having a waveguide pattern disposed at least 500 micrometers above said core layer, deoxygenating the core layer under the conditions of vacuum, purging with inert gas, or a combination of vacuum and purging with inert gas and then covering the core layer with an inert gas atmosphere;
d) lowering said photomask to a position substantially parallel to, and 5 to 20 micrometers above said core layer, and then imagewise exposing the photosensitive core composition through said photomask, to sufficient actinic radiation to only partially polymerize the core composition to a level below a substantially full curing of the core composition but beyond the gel point of the core composition, while maintaining the core coated substrate in an inert gas atmosphere;
e) developing the exposed core composition layer to remove the non-image areas while not removing the image areas;
f) coating a layer of a liquid, photosensitive overclad composition over at least the image areas of the core composition; then deoxygenating the overclad layer and all underlying layers under conditions of vacuum, purging with inert gas, or a combination of vacuum and purging with inert gas; overall exposing the overclad composition, under an inert gas atmosphere, to sufficient actinic radiation to substantially fully cure, the buffer composition layer if present, the clad composition layer if present, the core composition layer and the overclad composition layer;
and wherein the refractive index of the substantially fully cured, polymerized buffer composition is from about 0.75% to about 3% less than the refractive index of the substantially fully cured, polymerized core; and wherein the refractive index of the substantially fully cured, polymerized underclad composition is from about 0.3% to about 1.5% less than the refractive index of the substantially fully cured, polymerized core.

* * * * *